Oct. 30, 1951 S. A. SCHERBATSKOY 2,573,279

SYSTEM OF DETERMIINNG THE LISTENING HABITS OF WAVE SIGNAL RECEIVER USERS

Filed Nov. 9, 1946 4 Sheets-Sheet 1

Inventor
Serge A. Scherbatskoy
By Mueller and Mason
Attorneys

Oct. 30, 1951 S. A. SCHERBATSKOY 2,573,279

SYSTEM OF DETERMIINNG THE LISTENING HABITS OF WAVE SIGNAL RECEIVER USERS

Filed Nov. 9, 1946 4 Sheets-Sheet 2

Inventor
Serge A. Scherbatskoy
By
Mueller and Mason
Attorneys

Inventor
Serge A. Scherbatskoy
By Mueller and Mason
Attorneys

Oct. 30, 1951 S. A. SCHERBATSKOY 2,573,279

SYSTEM OF DETERMIINNG THE LISTENING HABITS OF WAVE SIGNAL RECEIVER USERS

Filed Nov. 9, 1946 4 Sheets-Sheet 4

Inventor
Serge A. Scherbatskoy

By Mueller and Mason

Attorneys

Patented Oct. 30, 1951

2,573,279

UNITED STATES PATENT OFFICE 2,573,279

SYSTEM OF DETERMINING THE LISTENING HABITS OF WAVE SIGNAL RECEIVER USERS

Serge A. Scherbatskoy, Tulsa, Okla.

Application November 9, 1946, Serial No. 709,017

5 Claims. (Cl. 346—37)

Figure 1:
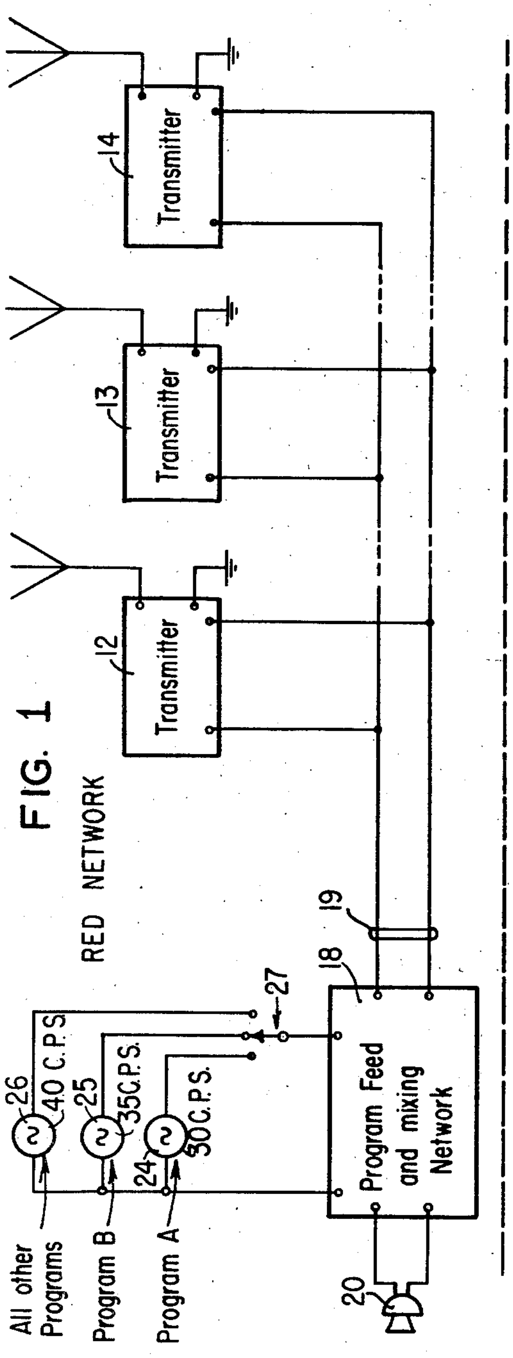

The present invention relates to systems and apparatus for determining the listening habits of users of wave signal receivers of the broadcast type and more particularly to improvements in systems for determining the audience popularity or rating of particular programs transmitted from one or more wave signal transmitters.

One of the principal objectives in determining the listening habits of broadcast receiver users is that of determining the effectiveness of radio advertising. Generally speaking, the effectiveness of any particular program as an advertising medium is directly related to the extent of listening to the program. To determine the magnitude of the audience listening to particular programs, two distinct types of sampling methods have been used. The first, or telephone call method of sampling, involves the making of hundreds of personal telephone calls to radio audience homes selected at random during the period when a particular program of interest is in progress, and statistical analysis of the results to determine the extent of listening to the particular program. Basically, there are a number of defects in this method which destroy the accuracy of the results obtained. These defects have led to the development of instrumented methods of sampling which do not require active audience collaboration and substantially eliminate the statistical error resulting from the random selection feature of the telephone call sampling technique, as well as many other defects impairing the accuracy of the results arrived at when this technique is employed. Instrumentation of the second method involves the use of a recording device operating in conjunction with each collaborator receiver used in the sampling system to record the extent of use of the receiver and to record as a function of time the transmitters to which the receiver is tuned to receive. Various recording devices have been proposed, for this purpose, none of which provide positive transmitter or program identification, and none of which form a record of station or transmitter choice which is susceptible of automatic decoding. Moreover, commercially available devices of this character are generally expensive to manufacture, install, and service in the field.

It is an object of the present invention, therefore, to provide a new and improved system for determining the listening habits of users of wave signal receivers.

It is another object of the invention to provide an improved system of the character described which obviates the problem of obtaining accurately timed record tape movement and permits positive record identification at each system collaborator receiver of the particular programs of interest in a phonographically reproducible form capable of high speed reproduction and automatic decoding or translation into statistically analyzable form.

It is a further object of the invention to provide a system of the character described which permits simple, reliable and relatively inexpensive instruments to be used at each system collaborators receiver, and also permits relatively simple and highly reliable equipment to be used in translating the records into statistically analyzable form.

According to a further object of the invention, the program identification recording operation is simplified and rendered more infallably accurate by radiating from each transmitter handling each particular program of interest a program identification signal which may be directly recorded to indicate the extent of reception of the program.

In accordance with a further object of the invention, an improved system is provided for causing the transmitters included in a network hook-up to radiate distinctive identification signals which not only identify each particular program of interest, but also the transmitter from which the program is being received.

Figure 2:
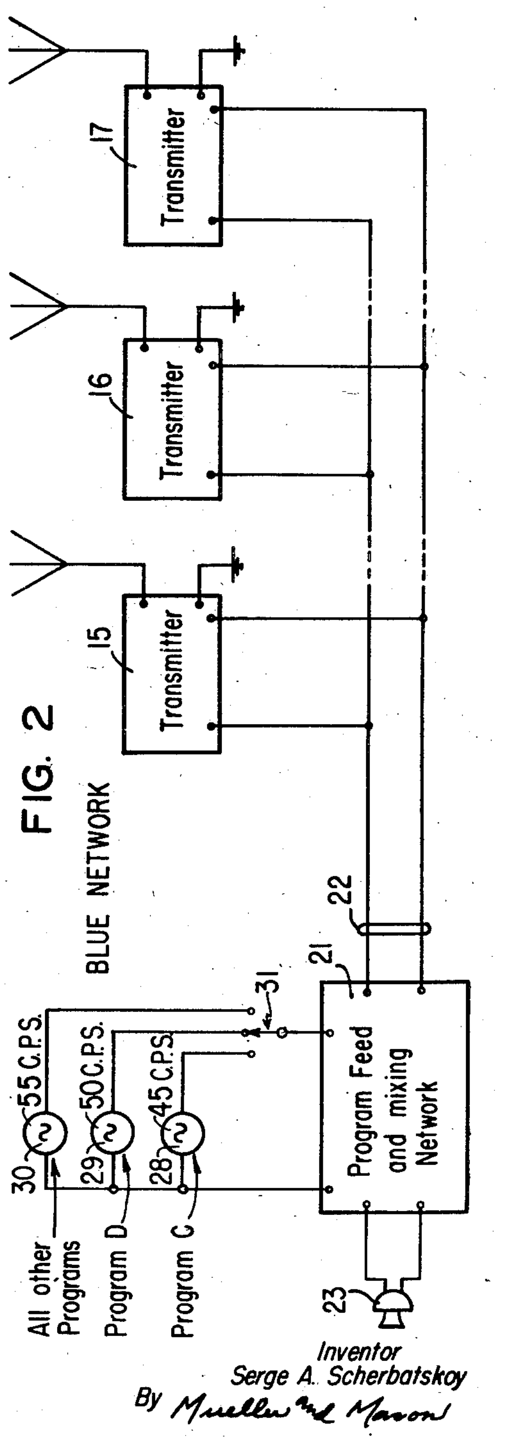
Figure 3:
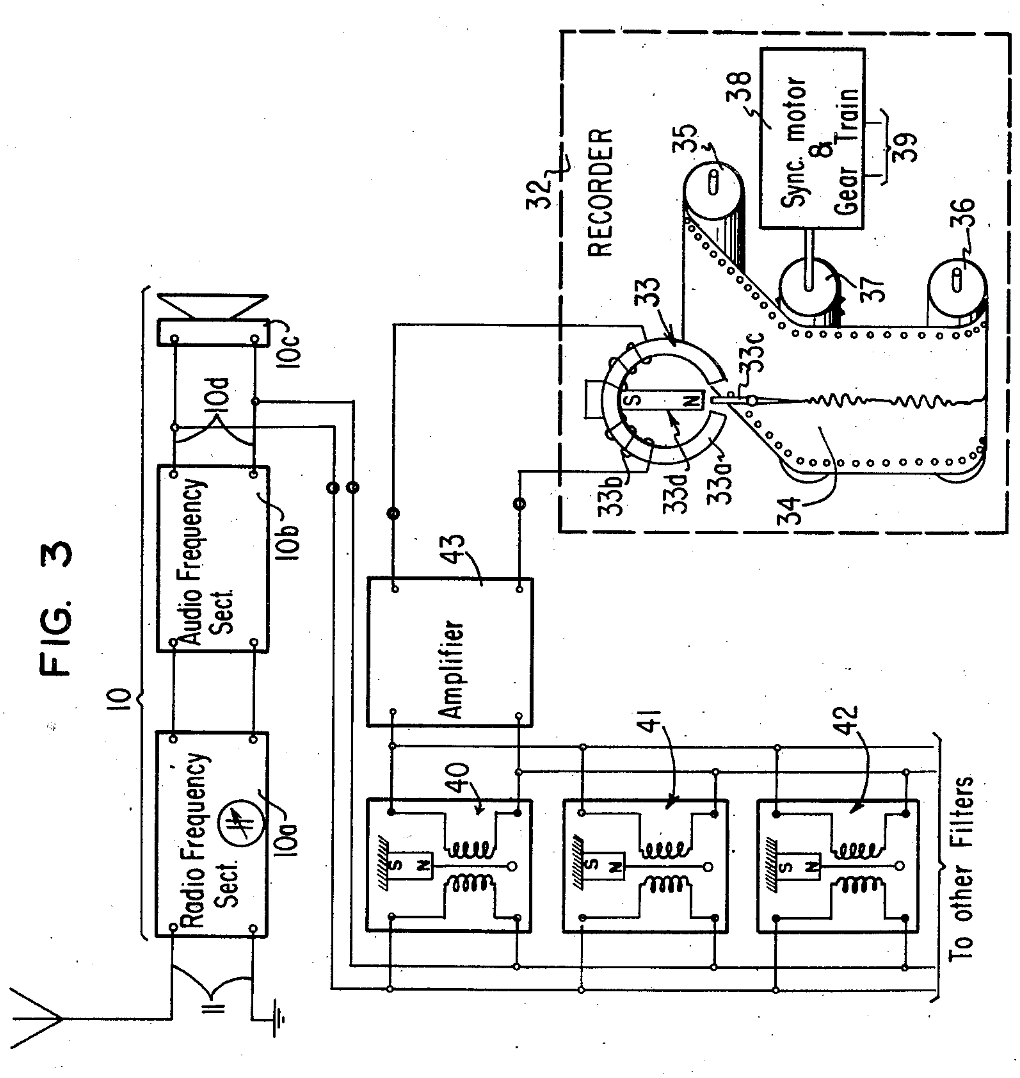
Figure 4:
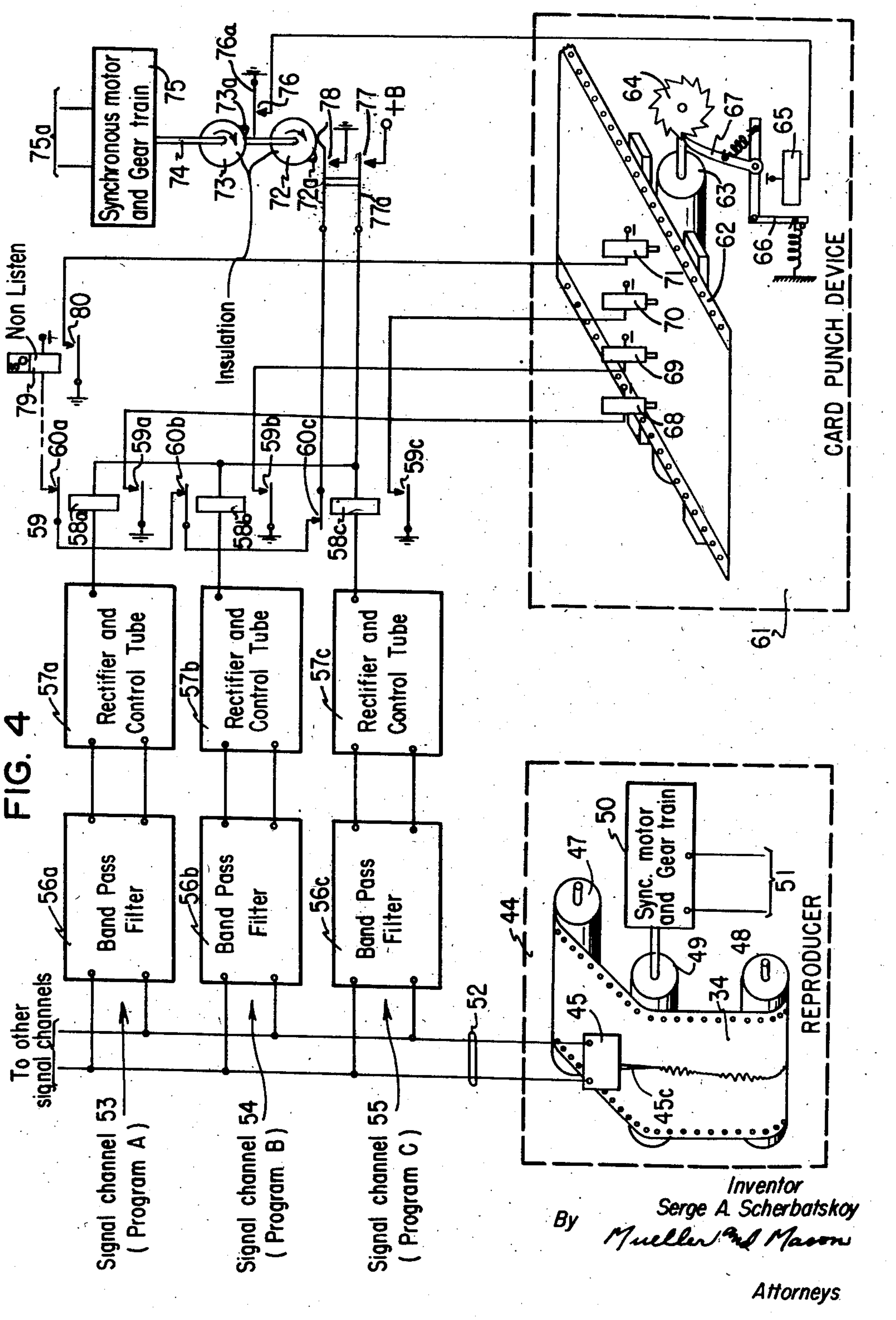
Figure 5:
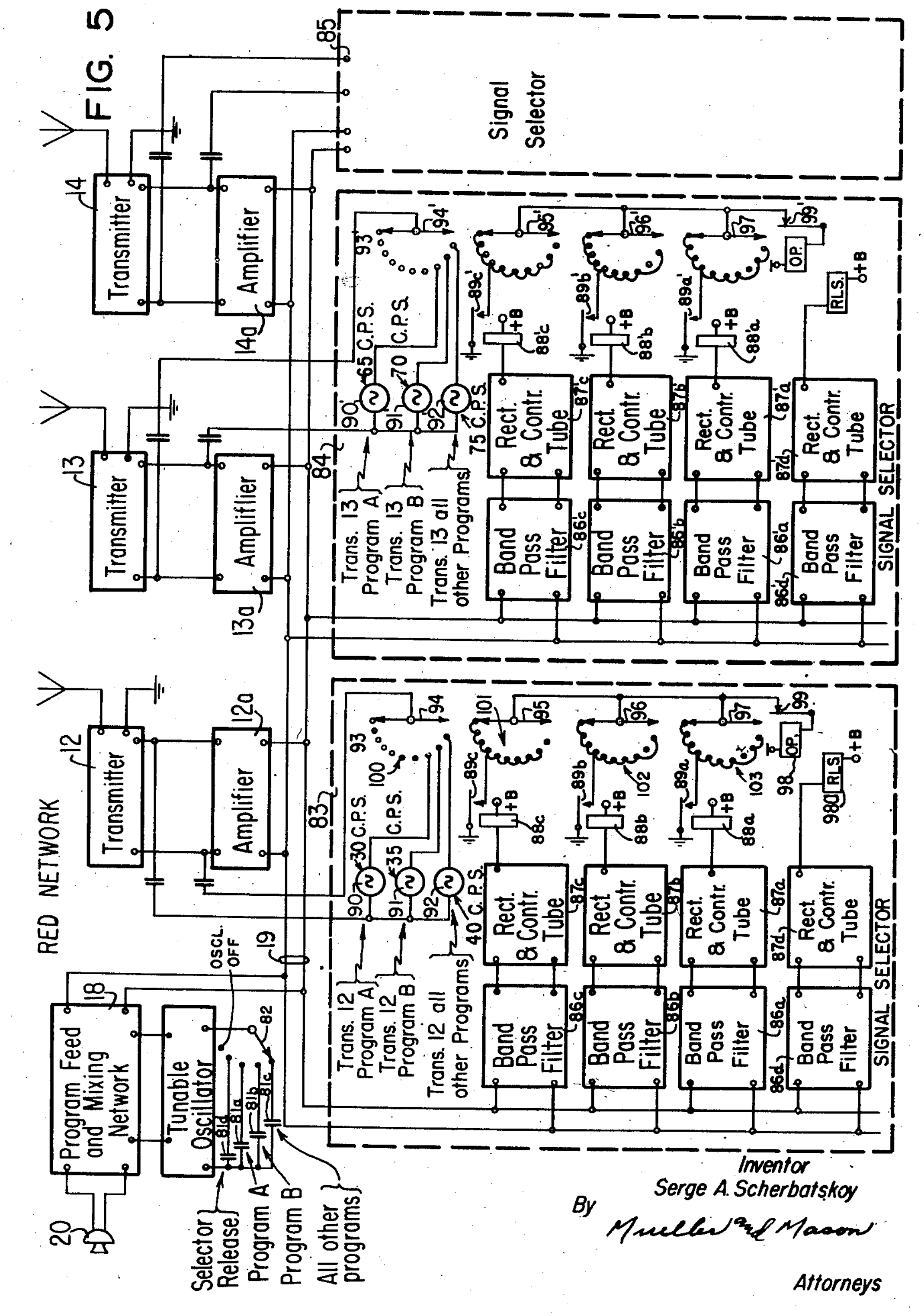

The invention, both as to its organization and method of operation, together with further objects and advantages thereof, will best be understood by reference to the following specification taken in connection with the accompanying drawings, in which:

Figs. 1 and 2 illustrate respectively two different network hook-ups of a plurality of wave signal transmitters forming a part of the present improved system;

Fig. 3 schematically illustrates the present improved recording facilities provided in conjunction with a system collaborators wave signal receiver to record the program identification signals radiated from the transmitters shown in Figs. 1 and 2;

Fig. 4 schematically illustrates the reproducing and translating equipment utilized to translate the record formed by the recorder shown in Fig. 3 into statistically analyzable form; and Fig. 5 schematically illustrates a modification of the facilities provided in conjunction with the network transmitter shown in Fig. 1 for impressing both program and station identification signals upon the respective signal carriers radiated from these transmitters.

Referring now to the drawings and more particularly to Figs. 1, 2 and 3 thereof, the present improved system is there illustrated as comprising a wave signal receiver 10 having an antenna ground circuit 11 and adapted for conventional broadcast receiver use in the home of a collaborator in the sampling system. This receiver may be of any desired commercial type and is illustrated as comprising a radio frequency section 10a, certain portions of which are tunable to condition the receiver for reception of signal modulated carriers radiated from one or more of the transmitters shown in Figs. 1 and 2 of the drawings. Following the radio frequency section 10a, the receiver 10 is provided with the usual audio frequency section 10b which feeds detected and amplified program signals to the voice coil of a loud speaker 10c. Although a single receiver has been shown by way of illustration, it will be understood that in actual practice several hundred broadcast receivers located in homes within the radiation areas of the particular programs of interest, are employed to provide the record information concerning the listening habits of the receiver users which is necessary for an accurate statistical determination of program audience ratings. In using the present improved system, it is contemplated that selection of the system collaborator homes, i. e. the homes in which wave signal receiver use is to be logged, shall be on a basis such that all of the variable factors, such, for example, as number of potential listeners, economical affluence, etc. which normally affect any process of sampling public opinion are accounted for on a weighted basis. In the interests of simplifying the disclosure, however, only a single wave signal receiver 10 and associated recording facilities have been illustrated in the drawings. While this receiver has been shown as being of the audio reproducing type, it will be understood from the following explanation that the present improved system is equally applicable for use in determining the listening habits of television or facsimile receiver users.

Since most, if not all, of the programs of particular interest to advertisers are of the so-called network variety involving simultaneous transmission of the same program from a plurality of wave signal transmitters located in geographically separated areas throughout the country, the present invention is illustrated in its use to determine the audience popularity or rating of particular network programs. To this end, the wave signal transmission facilities employed in two different networks arbitrarily designated the Fed and Blue networks have been illustrated in Figs. 1 and 2 of the drawings, respectively. Briefly, and referring to Fig. 1 of the drawings, the Red network comprises a plurality of wave signal transmitters 12, 13 and 14 which are signal channel connected by means of a signal channel 19 to a program feed and mixing network 18 located at the program originating point and into which the program signals are fed from one or more microphone pickups 20. Similarly, the Blue network is shown in Fig. 2 of the drawings as comprising a plurality of wave signal transmitters 15, 16 and 17 connected by a signal channel 22 to a program feed and mixing network 21 into which the program signals are delivered from one or more microphone pickups 23. In the usual network hook-up, high fidelity or wide band telephone channels 19 and 22 individual to the several transmitters of each network and commonly originating at the respective program feed and mixing networks 18 and 21, are employed for transmission of the program signals to the various transmitters. In the interests of simplifying the disclosure, however, parallel feed to the respective network transmitters from the program feed and mixing networks has been disclosed. It will be understood that in accordance with conventional practice the illustrated transmitters are of the modulated carrier type and that the particular form of modulation employed, i. e. AM or FM is optional.

In utilizing networks of the character just described to effect simultaneous transmission of the same program from a plurality of transmitters, only a relatively few programs are of particular interest from the standpoint of analysis for the purpose of determining the advertising value thereof. In accordance with the present invention, therefore, facilities are provided in conjunction, with the program feed and mixing network of each network hook-up for radiating program identification signals along with the programs of particular interest, and for radiating a network identification signal along with all other programs having network distribution. Briefly, and as shown in Fig. 1 of the drawings, these facilities as provided in conjunction with the program feed and mixing network 18 comprise signal generators 24 and 25 for generating signal voltages of near sub-audible frequencies individually identifying two different network programs A and B of particular interest, and a third near sub-audible frequency signal generator 26 for identifying all other programs of Red network origin. These three signal generators are adapted to deliver their output voltages selectively to the program feed and mixing network 18 through a multi-position selector switch 27 for mixing with the program signals developed by the microphone pick-up 20 and for transmission along with these signals over the channel 19 to each of the transmitters 12, 13 and 14 for radiation. Although only two near sub-audible frequency generators 24 and 25 individual to two different programs of particular interest have been referred to, it will be understood that as many of these generators as may be required to provide identification of all particular programs of interest may be used. Program identification is obtained on a frequency basis, and to that end the output frequencies of the three generators 24, 25 and 26 are different. By way of illustration, it may be pointed out that the output frequencies of these generators may be 30, 35 and 40 cycles per second, respectively.

In a similar manner, signal generators 28, 29 and 30 capable of generating signal voltages of near sub-audible frequencies are provided in association with the program feed and mixing network 21 for selective mixing with the program signals developed by the microphone pickup 23 through a multi-position selector switch 31. The output frequencies of the two generators 28 and 29 may be employed individually to identify two programs C and D of particular interest handled by the Blue network, while the output frequency of the third generator 30 may be employed to identify all other programs of Blue network origin. Since program identification is obtained on the basis of discrimination between the near sub-audible frequencies representative of the various programs, it will be understood that the output frequencies of the generators 28, 29 and 30 must differ from each other and also from the output frequencies of the generators 24, 25 and 26 associated with the program feed and mixing network embodied in the Red network hookup shown in Fig. 1. To this end, the generators 28, 29 and 30 may have output frequencies of 45, 50 and 55 cycles per second, respectively. Generaly speaking, the signal generators 24 through 30 and the other generators of like character provided in the system may be of any desired commercial type capable of producing signal voltages of the required magnitude at the particular frequencies specified. Preferably, however, these generators are individually of the type described in General Radio "Experimenter" volume XX No. 4 September 1945, Cambridge 39, Massachusetts. Moreover, in order to prevent a signal voltage as developed by a selected one of these generators and modulated upon the carrier outputs of the respective associated transmitters from being manifested as objectionable volume variations at the receivers receiving signals from these transmitters, the signal voltages produced by the generators 24, 25, etc. should be so limited in magnitude as to prevent more than 7% modulation of the carriers respectively radiated by the network transmitters.

As will be evident from the above explanation, exceedingly low program identification signal frequencies are radiated from the network transmitters along with the programs of network origin. As will appear hereinafter, these signals are directly recorded at each collaborator receiver where they are received to provide record indications of the reception of the particular programs which they respectively represent. The importance of employing very low near subaudible frequencies thus becomes apparent. Specifically, the lower the frequency of the program identification signal, the slower the speed of record tape movement may be while preserving the accuracy of program identification signal recording. By using program identification signal frequencies which will permit the slowest possible record tape movement, the extent of record tape use during a given time interval is obviously minimized.

For the purpose of producing a record indication of the program of particular interest received at the respective collaborator receivers used in the system, each such receiver is provided with means electrically coupled to the audio frequency signal channel thereof and selectively responsive to the reception or non-reception of the program identification signals for producing a decodable record indication of the extent of reception of the particular programs of interest. Briefly, and referring again to Fig. 3 of the drawings, the equipment provided in association with the collaborator receiver 10 for this purpose comprises a tape recorder 32, an amplifier 43 and a plurality of filters 40, 41, 42, etc. which are sharply tuned respectively to the different frequencies of the different program identification signals. These filters, which are preferably of the vibrating reed electromechanical type, have their input terminals parallel connected to the audio frequency channel of the receiver 10, i. e. across the voice coil leads 10*d*. The output terminals of these filters are parallel connected to the input terminals of the amplifier 43 which in turn has its output terminals bridged by the driving coil 33*b* of the recording head 33 embodied in the recorder 32. The filters are connected to prevent the regular program signals appearing in the audio channel of the receiver from being impressed upon the driving coil 33*b* of the recording head 33 for recording in the recorder 32. Preferably, the recorder 32 is of the commercial type, described, for example, in "Radio News" June 1946, pp. 36–108, embodying a cellophane tape 34 movable between a supply spool 35 and a takeup spool 36 and driven at a constant speed by a sprocket 37 having spaced peripheral teeth engageable with edge perforations in the tape 34. Constant speed rotation of the sprocket 37 is obtained by shaft connecting this sprocket to a synchronous motor and gear train unit 38, the synchronous motor of which is adapted for energization from any commercial source of alternating current of constant frequency indicated by the bracketed terminals 39. High fidelity recording on the tape 34 is obtained by employing a jewel tipped cutting stylus 33*c* pivotally supported as a part of the recording head 33 and having an armature end disposed in the air gap conventionaly provided in the field structure 33*a* of this head. As shown, the recording head 33 is of the permanent magnet polarized type, including as a part of its field structure, a permanent polarizing magnet 33*d* which normally maintains the armature end of the stylus 33*c* in a neutral position between the pole face ends of the field structure. As thus constructed, and with the driving coil 33*b* connected to the output terminals of the amplifier 43 for energization in accordance with the signals selectively passed by the filters 40, 41, 42, etc., the jeweled cutting tip of the stylus 33*c* is vibrated at the exact frequency of received program identification signal to record this signal as a periodic wave upon the cellophane record tape 34. A positive identification of the received program of particular interest is thus produced which is capable of phonographic reproduction and translation on an automatic basis. Since, as explained above, the program identification signal frequencies are of a very low order of magnitude, it will be readily apparent that they may be accurately recorded with the tape 34 travelling at a very low speed. Hence, with the recorder 32 in continuous operation, the amount of tape used per unit time interval is reduced to a minimum.

The terms phonographic reproduction and phonographically reproducible as used herein denotes any system or method of translating the record indications into electrical signals by phonographic pickup means and exclude visual scanning and photographic duplicating processes. Under this definition magnetic records on a magnetic wire or tape may be considered as the full equivalent of the cellophane tape system of recording herein described.

For the purpose of translating the program identification signals as recorded upon the cellophane record tapes at the various collaborator receivers employed in the system into statistical analyzable form, the translating equipment schematically illustrated in Fig. 4 of the drawings may be employed. This equipment is located at a central office to which the record tapes are mailed or otherwise delivered from the various collaborator receivers. In brief, it comprises a reproducing unit 44 having a reproducing head 45 for delivering the reproduced signals over a common channel 52 to the input sides of a plurality of signal channels 53, 54, 55, etc. individually corresponding to the programs of particular interest and to the identification signals representing all other network programs. The reproducer 44 is identical in construction with the recorder 32 provided at each of the collaborator receivers. Specifically, the reproducer 44 is schematically illustrated as comprising a pickup head 45 identical with the recording head 44 and including a pickup stylus 45c which follows the signal track along the cellophane record tape 34 during movement of this tape between a supply spool 47 and a takeup spool 48 under the influence of a driving sprocket 49. A synchronous motor and gear train unit 50 shaft connected to the driving sprocket 49 and including a synchronous motor arranged for energization from a suitable constant frequency alternating current source 51 is utilized to drive the sprocket 49 and hence the tape 34 at the desired predetermined constant speed.

Individually, the signal channels 53, 54, 55, etc. are of identical arrangement, each being provided with a band pass filter 56 having its input terminals connected to the common channel conductors 52 and its output terminals coupled to the input side of a rectifier and control tube 57 which in turn is arranged to control a signal repeating relay 58. Suitable subscripts A, B and C have been employed to differentiate the identified signal channel components as respectively provided in the signal channels 53, 54 and 55.

As explained more fully below, one feature of the present invention relates to use of the reproducer 44 to reproduce the recorded identication signals at an audio frequency rate, thereby to speed up the record tape decoding operation, and to emphasize the frequency difference between the frequencies of the identification signals corresponding to different predetermined programs. This feature of the invention also facilitates the design of the band pass filters 56a, 56b, 56c, etc. in that conventional audio frequency filters sharply tuned to different predetermined audio frequencies may be employed at the filter stage of each of the signal channels 53, 54, 55, etc. More specifically, reproduction of the recorded program identification signal in the recorder 44 is accomplished at a record tape speed which is a constant multiple of the standardized record tape speed employed in the recorders 32 provided at the respective collaborator receivers. The multiplication factor between the record tape speed in the reproducer and the standardizer record tape speed in the recorders is preferably of the order of 100. This means that if the signal generated by the signal generator 24 to identify the program A, for example, is 30 cycles per second and is recorded on this basis, it will be reproduced in the reproducer 44 at a frequency rate of 3,000 cycles per second such that the band pass filter 56a in the signal channel 53 corresponding to the particular program A must be sharply tuned to 3,000 cycles in order to pass the reproduced signals indicative of this particular program. Similarly if the signal generator 25 develops a signal voltage varying at the rate of 35 cycles per second to identify the particular program B and is recorded on this frequency basis, it will be reproduced in the reproducer 44 at a frequency rate of 3500 cycles per second. This means that the band pass filter 56b embodied in the signal channel 54 corresponding to the particular program B must be sharply tuned to pass signals of a frequency of 3500 cycles per second in order that this signal channel may be used to transmit signals representing the particular program B. Similarly, the band pass filter 56c must be sharply tuned to an audio frequency of 4000 cycles per second in order that the signal channel 55 may be used to pass reproduced signals identifying the particular program C. Obviously, the filters 56a, 56b, 56c, etc. must be designed completely to reject signals having frequencies departing from the filter peaking frequencies by as much as a few hundred cycles per second. Audio frequency filters suitable for this purpose are commercially available to the art.

Each of the rectifier and control tube units 57a, 57b, 57c, etc. may be of any conventional form. Briefly, each unit has the function of first rectifying signals delivered thereto from the preceding band pass filter and utilizing the rectified signal voltage to produce sufficient current flow through the associated repeating relay 58 to effect operation of this relay in the manner explained below. In this regard it is pointed out that anode voltage is applied to the anodes of the control tubes respectively provided in the units 57a, 57b, 57c, etc. through the windings of the repeating relays 58a, 58b, 58c, etc., respectively associated with these units.

As the reproduced signals are selectively passed through the signal channels 53, 54, 55, etc. to the effect that selective operation of the repeating relays 58a, 58b and 58c, these relays are periodically operated for the purpose of selectively controlling the card punch magnets of a card punch device 61. This device may be of any conventional form and for that reason only the essential components thereof have been diagrammatically illustrated in the drawings. Specifically, the device 61 comprises punch magnets 68, 69, 70, etc. individually corresponding to the programs of particular interest and relative to which a statistically analyzable record card 62 is adapted to be advanced on a step by step basis by means of an advancing sprocket 63. This sprocket has teeth engaging the edge perforations of the card 62 and is arranged for actuation by a magnet controlled stepping mechanism comprising an operating magnet 65. For the purpose of translating energization of this magnet into longitudinal movement of the record card 62, a ratchet and pawl mechanism is provided which comprises a ratchet wheel 64 carried by the extended shaft of the advancing sprocket 63 and a pawl 67 engaging the toothed periphery of the ratchet wheel 64. This pawl is pivotally supported by a rotatably mounted and spring biased armature 66 which is attracted toward the pole face end of the magnet 65 when this magnet is energized. In order to record the non-listening intervals which may be manifested as a straight line in any record tape 34 reproduced in the reproducer 44, the translating equipment is also provided with a slow-to-operate non-listen relay 79 which is arranged directly to control a non-listen punch magnet 71 in the card punch device 61. Energization of this relay is under the control of a chain circuit which extends through break contacts 60a, 60b, and 60c respectively embodied in each of the repeater relays 58a, 58b, 58c, etc., so that it only operates during a given card punch interval in the absence of repeater relay operation.

For the purpose of periodically conditioning the repeating relays 58a, 58b, 58c, etc. and the non-listen relay 79 for selective operation under the control of the signals selectively passed through the channels 53, 54, 55, etc. or the complete absence of such signals, a commutating device is provided which comprises a pair of commutating cams 72 and 73. These cams are commonly mounted for rotation with a drive shaft 74 which is rotated at a constant speed by means of a synchronous motor and gear train unit 75, the synchronous motor of which is adapted for energization from any suitable constant frequency alternating current source 75a. The commutating cams 72 and 73 are each constructed of insulating materials and are respectively provided with cam lobes 72a and 73a for respectively closing the contact springs 77, 78 and 76 on a periodic basis. In order to insure operation of the advancing mechanism of the card punch device 61 during each interval when the punch magnets 68, 69, 70, 71, etc. of this device are deenergized, the cam lobe 73a is positioned to lag the cam lobe 72a in the direction of rotation of the two cams 72 and 73 so that the contacts 76 are only closed during intervals when the contacts 77 and 78 are open. As indicated above, the windings of the repeating relays 58a, 58b, 58c, etc. are adapted for energization from the current source which supplies anode potential to the control tubes of the rectifier and control tube units 57a, 57b, 57c, etc. Accordingly, the lower contact spring 77 has been labeled +B for connection to the positive terminal of the anode current source. The non-listen relay 79, and the punch magnets 68, 69, etc. and stepping magnet 65 of the card punch device 61, on the other hand, are adapted for energization from a direct current source of appropriate voltage having its positive terminal connected to a grounded bus and its negative terminal connected to each of the magnet and relay terminals identified by the negative polarity symbol.

Before describing the operation of the system as a whole, it is pointed out that in accordance with the preferred mode of operating the system, the recorders 32 are continuously operative in the sense that the record tapes 34 thereof are continuously driven past the recording stylus 33c. Periodically the field personnel of the system operators remove the record tapes having station identification signal information recorded thereon and replace the removed tapes with new tapes. As each tape is placed in operation in a recorder, the starting time thereof is accurately indicated thereon. Likewise, as each tape is removed from a recorder 32, the exact time of tape movement stoppage is suitably inscribed or otherwise marked thereon. Each tape, thus removed from a recorder together with an identification of the collaborator home from which extracted, is mailed or otherwise transmitted to the central office of the system operators for translation into statistically analyzable form through the use of the equipment illustrated in Fig. 4 of the drawings. It will thus be apparent that the time factor is measured in terms of tape length and is susceptible of program correlation in the decoding process. Further, with the recorders 32 in continuous operation, they are at all times conditioned to produce on a time basis a record of any network program which may actually be received and reproduced by any one or all of the collaborator receivers. Further, and since the record tapes 34 are continuously driven, a record is formed of the extent of use or non-use of each wave signal receiver provided in a collaborator's home.

With the recorders at the various collaborator receivers in continuous operation, records are made in these recorders of those programs radiated from the Red and Blue networks which may be received and reproduced by the respective associated wave signal receivers. In this regard it will be understood that at the exact instant broadcasting of the program A by the Red network as shown in Fig. 1 of the drawings is started, the selector switch 27 is actuated to connect the program identification signal generator 24 to the program feed and mixing network 18 or to connect the all other programs signal generator 26 to this network. It will also be understood that during all periods when a particular program having assigned thereto a specific identification signal is not being broadcast, the all other programs identification signal is radiated as a modulation component upon the signal outputs of the transmitters included in the network hook up. In an entirely similar manner the selector switch 31 may be adjusted selectively to introduce signal voltages derived from the generators 28, 29 and 30 into the program feed and mixing network 21 for radiation by the transmitter 15, 16 and 17 included in the Blue network hook up.

To consider a specific and exemplary case, it may be assumed that the particular programs A and C are overlappingly radiated from the Red and Blue network during a particular time period of a specific day. It may be assumed further that the user of the wave signal receiver 10 listens to the program A as received from the transmitter 12, for example, during a portion of this period and then tunes the receiver 10 for reception of the program C from the transmitter 15 included in the Blue network. During the initial portion of the program when the program A is being received, the signal modulated carrier picked up from the transmitter 12 by the antenna ground circuit 11 is selected, amplified and detected in the signal channel of the receiver 10 and impressed across the voice coil leads 10d for reproduction by the loud speaker 10c. The program identification signal of 30 cycles per second also appears in the audio channel of the receiver 10 across the voice coil leads 10d and is impressed across the input terminals of the filters 40, 41, 42, etc. Due to the near sub-audible frequency employed and the low percentage modulation of the carrier the response of loud speaker 10c to this signal voltage is entirely inaudible to the program listeners. As stated above, the filters 40, 41 and 42 are individually tuned to respond only to program identification signals of particular and different frequencies. Assuming, for example, that the filter 40 is provided to pass signals of the frequency of 30 cycles per second identifying the program A, this filter develops a signal voltage across its output terminals of corresponding frequency which is amplified through the amplifier 43 and impressed upon the driving coil 33b of the recording head 33 to effect corresponding vibration of the recording stylus 33c. In responding to this signal, the stylus 33c inscribes a sinusoidal wave of a frequency corresponding to the frequency of 30 cycles per second upon the surface of the cellophane tape 34 as this tape travels between the supply spool 35 and the take-up spool 36. This wave continues to be inscribed on the record tape 34 throughout the interval the program A is being received at the receiver 10. When, however, this receiver is tuned for reception of the program C from the transmitter 15 in the Blue network, the corresponding program identification signal voltage of 45 cycles per second appears across the voice coil leads 10d in lieu of the program identification signal voltage corresponding to the program A. Accordingly, operation of the filter 40 to transmit the signal voltage to the recorder 32 is arrested in lieu thereof the new program identification signal is passed to the driving coil 33b of the recording head 33 through the filter 42 individually corresponding to the program C. As a result, the periodicity of vibration of the stylus 33c is changed to inscribe a sinusoidal wave of different frequency upon the record tape 34. Inscription of this wave upon the record tape continues either until termination of the program C, or until the receiver 10 is tuned for the reception of another program originating at a station other than the stations 15, 16 and 17 included in the Blue network hook-up.

From the above explanation it will be understood that as the receiver 10 is tuned for the reception of various programs, corresponding changes are made in the frequency of the periodic wave inscribed upon the record tape 34. It will also be apparent that the persistence interval of a recorded signal of a particular frequency is measured in terms of the length of the tape segment required to record the signal. It will further be understood that if all wave signal transmitters within the radius of reception of the receiver 10 carry either station or program identification signals during all periods when they are on the air, a record is formed on the record tape 34 identifying each period of time during which the receiver 10 is in use. In this regard it is pointed out that when the receiver 10 is not in use, signal voltages are not delivered to the driving coil 33b. Hence the stylus 33c remains in its neutral position to inscribe a straight line upon the record tape 34. Thus a record tape as removed from the recorder 32 at the end of a given period of time will ordinarily contain a number of straight line record segments representing periods of receiver non-use, interspersed with sinusoidally formed record waves of different frequencies representing different programs or stations to which the receiver 10 has been tuned during the use period.

In translating the information recorded on the record 34 at the central office into statistically analyzable form, the record tape 34 is inserted in the reproducer 44 for movement past the reproducing stylus 45c at a speed which, as explained above, may be several hundred times greater than the standardized speed of record tape movement in the recorder 32. Preparatory to translation of the record information into punched card form, a card 62 individual to the record tape is placed in the card punch device 61 for step by step longitudinal movement under the influence of the driving sprocket 63. In this regard, it is pointed out that the card 62 may be ruled transversely thereof to provide punch spaces individually representing successive predetermined increments of listening time. Also, the card 62 may be ruled longitudinally thereof to divide the record area into transverse sections individually corresponding to different programs. Preliminary to the decoding operation, the starting time as recorded on the tape 34 is code punched into an appropriate space provided transversely of the card 62 for this purpose.

With the reproducer 44 and the card punch device 61 thus conditioned for operation and the pulsing cams 72 and 73 in operation, the relays 58a, 58b, 58c, etc. and 79 function to so control the punch magnets 68, 69, 70, etc. and 71 that the card 62 is punched in accordance with the information recorded on the record tape 34. Specifically, and assuming that the first identification signal recorded on the record tape 34 is that identifying the program A, this signal as picked up by the reproducing head 45 is transmitted over the channel 52 as an audio frequency signal of 3000 cycles, for example, to the input sides of the filters 56a, 56b, 56c, etc. Since all of the filters other than the filter 56a are designed to reject signals of this particular frequency, no response is produced by the repeating relays 58b, 58c, etc. individually associated therewith. The signal voltage is, however, passed by the filter 56a, rectified in the rectifier section of the unit 57a and utilized to decrease the bias applied to the input electrodes of the control tube provided in this unit, thereby to condition the repeating relay 58a for operation. Thereafter and when the cam lobe 72a next acts to close the contacts 77 and 78, a circuit is completed at the contacts 77 for energizing the repeating relay 58a from the +B current source through the space current path of the control tube provided in the unit 57a. At the contacts 78, a circuit is also completed through the chain contacts 60c, 60b, 60a, etc. for energizing the non-listen relay 79. Due to the slow-to-operate characteristic of this relay, however, it does not immediately operate when energized in this circuit. The relay 58a, when energized in the above-traced circuit operates and opens its contacts 60a to interrupt the chain energizing circuit for the non-listen relay 79 and thus prevent the latter relay from operating. At its contacts 59a, the relay 58a completes an obvious circuit for energizing the punch magnet 68 individually corresponding to the program A. This magnet, in attracting the punch armature associated therewith, punches a hole in the record card 62 in the particular space located transversely of the card assigned to the program A and in the particular space located longitudinally of the tape corresponding to the first increment of listening time.

Shortly after the magnet 68 is thus operated to produce a record on the card 62 indicative that the program A was listened to by the user of the wave signal receiver 10 during the first increment of listening time, the cam lobe 72a rides out from under the cam follower portion of the contact spring 77a, permitting the contacts 77 and 78 to open. At the contacts 78, a second point is opened in the chain operating circuit for the non-listen relay 79. At the contacts 77, the repeating relay 58a is de-energized and restores to interrupt the operating circuit for the magnet 68 at the contacts 59a. When this magnet is thus de-energized, it retracts its card punch armature in preparation for advancement of the card 62 to a position corresponding to the next succeeding increment of listening time under the influence of the card advancing sprocket 63.

After the magnet 68 releases its card punch armature, the cam lobe 73a rides into engagement with the cam follower portion of the contact spring 76a to close the contact 66 and thus complete an obvious circuit for energizing the stepping magnet 65 of the card punch device 61. In attracting its armature 66, this magnet functions to advance the card 62 to the next punch position under the influence of the ratchet and pawl mechanism 64, 67 and the advancing sprocket 63. After the card 62 has thus been advanced to the next punch position corresponding to the next succeeding increment of listening time, the cam lobe 73a rides out of engagement with the cam follower portion of the contact spring 76a permitting the contacts 76 to open and deenergize the magnet 65. Incident to the release of the armature 66, the pawl 67 is retracted to engage the next succeeding tooth of the ratchet wheel 64 and thereby condition the card advancing mechanism to advance the card 62 to the next succeeding punch position.

From the above explanation it will be apparent that so long as the recording head 45 continues to reproduce the program identification signal assigned to the particular program A, the repeating relay 58*a* is periodically operated under the control of the pulsing cam 72 to effect periodic operation of the punch magnet 68 individually corresponding to the program A and thus produce a succession of punch holes longitudinally of the card 62 in the space allotted transversely of this card for recording program A listening time. It will further be understood that the card advancing mechanism comprising the pulsing magnet 65 is periodically energized under the control of the pulsing cam 73 to advance the card 62 one step during each interval when the repeating relay 58*a* is de-energized.

As the decoding operation proceeds, the repeating relays 58*a*, 58*b*, 58*c*, etc. are selectively energized under the control of the program identification signals reproduced by the reproducing head 45 selectively to control the punch magnets 68, 69, 70, etc. in the production of the punched card record identifying the particular programs listened to by the user of the wave signal receiver 10. Thus, each time the reproducing head 45 picks up an identification signal identifying the program B, the signal voltage is passed exclusively by the filter 56*b* to the rectifier and control tube unit 57*b* to condition the repeating relay 58*b* for periodic operation under the control of the pulsing cam 72. Similarly, each time the reproducing head 45 picks up a program identification signal identifying the program C, the signal voltage is passed through the filter 56*c* to the rectifier and control tube unit 57*c* to condition the repeating relay 58*c* for periodic operation under the control of the cam 72. The two repeating relays 58*b* and 58*c* respectively and directly control the punch magnets 69 and 70 individually corresponding to the programs B and C through their respective associated make contacts 59*b* and 59*c*. Further, each repeating relay includes a set of break contacts in the chain energizing circuit for the non-listen relay 79 such that the latter relay is prevented from operating if any one of the repeating relays operates to indicate that a particular program or station was listened to during the particular increment of time in question. It will also be understood that the record card 62 is periodically advanced under the control of the cam 73 during the interval immediately following each card punch operation.

As previously pointed out, if all of the transmitters within the radius of reception of the wave signal receiver 10 are equipped with facilities for radiating identification signals during all periods of broadcast transmission, periods of non-use of the receiver 10 are identified as straight segments on the record tape 34. This necessarily means that during the reproducing operation, no signal voltage is developed by the reproducing head 45 when the stylus 45*c* is following a straight line segment of the track on the record tape 34 to identify a receiver non-use period. Under these circumstances none of the repeating relays 58*b*, 58*c*, etc. is conditioned for operation during such a period. Hence all of the repeating relays remain in their respective released settings during decoding of those segments of the tape 34 representing non-use periods of the receiver 10. Accordingly, the slow-to-operate non-listen relay 79 is energized in its chain energizing circuit through the contacts 78 during each portion of a period of this type when the contacts 78 are closed. In operating, the relay 79 closes its contacts 80 to complete an obvious circuit for energizing the non-listen punch magnet 71. Each time this magnet operates it punches a hole in the transverse portion of the card 62 allotted for the recording of non-listening time. Thus it will be apparent that the repeating relays and the non-listen relays coact with the card punch device 61 to produce a punched card pattern capable of statistical analysis which contains all necessary information regarding the extent of use of the receiver 10, the particular periods during which it was in use, and the particular programs or stations listened to during the use period. Further, by statistically analyzing the record information thus punched into a large number of cards representative of extended periods of use of a large number of wave signal receivers most of the factors entering into the sales effectiveness of any particular program may readily be determined. This is easily accomplished by known statistical methods, usually involving the use of statistical analyzing machines.

From the above explanation it will be partially apparent that one of the limitations upon the factor of multiplication between the speed at which the record tape 34 is moved during reproduction and the standardized speed of tape movement during recording is that imposed by the upper cut-off frequency of the record reproducing device. Another important factor is that due to the operating and release times of the repeating relays and the non-listen relay and the response time of the card advancing mechanism and punch magnets in the card punch device 61. By way of illustration it may be assumed that the record information is to be analyzed on a five minutes of listening time basis, i. e. that a record indication is to be punched into the record card 62 at the end of each five minute interval of use or non-use of the wave signal receiver 10. Assuming that the standardized speed of tape movement during recording is 144 inches per hour (a speed entirely satisfactory for high fidelity recording of the near sub-audible identification signals) and that the speed of record tape movement during reproduction is 100 times as great, i. e. 14,400 inches per hour, each hour of tape reproducing time represents 1200 five minute intervals of receiver use. Dividing the 3600 seconds (one hour) of reproducing time by the 1200 five minute intervals of listening time, it is found that the card punch operation representing each 5 minute interval of listening time must occur in 3 seconds. This interval is entirely adequate to permit full and complete operation of the relay and card punch equipment in the manner explained above. Thus in this illustrative example, each card punch interval may be completed within a period of .5 second when effected by one of the repeating relays 58*b*, 58*c*, etc. Secondly, each non-listen interval punching operation may be completed in 1 second under the control of the slow-to-operate relay 79. This leaves a minimum of 1.5 seconds for advancement of the record card 62 to be completed. To achieve the reproducing and translating rate just considered, the cams 72 and 73 must be rotated at a speed of 20 revolutions per minute.

From a consideration of the example just given, it will be understood that if the multiplication factor between the speed of reproduction and the standardized speed of tape movement during recording is increased while maintaining the campling process on a five minute listening time basis, the period allotted for response of the relay and card punch equipment is correspondingly reduced. Also, for a given standardized speed of tape movement during recording and a given multiplication factor, this period is reduced in direct proportion to the extent of the listening time sampling interval. Using standard relay and card punch equipment, however, the above exemplary constants for the recording and reproducing speeds may be regarded as good practice in a typical system operation where sampling on a five minute listening time basis is desired.

As will be evident from the preceding explanation, particularly with reference to the network hook-ups shown in Figs. 1 and 2 of the drawings, no provisions are there made for identifying the particular transmitter as well as the particular program from which the signals carrying the particular program may be received. This means that in overlapped areas where a given wave signal receiver is capable of receiving signals from two transmitters carrying the same network program, no record indication is given as to the particular transmitter from which a given particular program is received. To arrive at certain statistical factors influencing a determination of the effectiveness of a program in promoting sales, it is desirable to identify not only the particular program received, but also the particular station or transmitter from which the program was received. To this end, the Red network system as shown in Fig. 1, for example, may be modified to include the program and station identification facilities illustrated in Fig. 5 of the drawings. As there shown, the program signals picked up by the microphone pickup 20 and transmitted over the signal channel 19 from the program feed and mixing network 18 are impressed upon the input terminals of the transmitters 12, 13 and 14 through program signal amplifiers 12*a*, 13*a* and 14*a* respectively. These transmitters also have individually associated therewith station and program identification signal selectors 83, 84 and 85 which are selectively controllable over the signal channel 19 from the point of program origin to impress upon the radiated carrier outputs identification signals individually identifying both the transmitter and the program being radiated thereby.

For the purpose of selectively controlling the signal selectors 83, 84 and 85 to effect preselection of the identification signals corresponding to particular programs, a tunable oscillator 81 equipped with a plurality of tuning condensers 81*a*, 81*b* and 81*c* is provided to feed its signal output voltage into the program feed and mixing network 18 for transmission over the channel 19 to each of the 3 signal selectors. Tuning of the oscillator 81 is accomplished on a selective basis through the provision of a selector switch 82 which may be actuated selectively to include the tuning condensers 81*a*, 81*b*, 81*c* and 81*d* in the frequency determining circuit of the oscillator. Preferably, this oscillator is adapted to generate signal voltages of different frequencies within the audio or super-audible range. For example, the tuning condensers 81*a*, 81*b*, and 81*c* and 81*d* when respectively included in the frequency determining circuit of the oscillator 81 may cause this oscillator to develop output frequencies of 5000, 6000, 7000 and 8000 cycles per second respectively. In the illustrated arrangement, these signal frequencies respectively identify programs A and B of particular interest, all other programs, and selector release.

In general, the signal selectors respectively provided at the transmitters 12, 13 and 14 are of substantially identical circuit arrangement. Briefly, the selector 83 comprises 3 alternating current signal generators 90, 91 and 92 having different output frequencies in the near sub-audible range which commonly identify the transmitter 12 and respectively identify the programs A and B and all other programs. For the purpose of selectively coupling these generators for the delivery of their respectively output voltages to the input terminals of the transmitter 12, a 10 point selector switch 93 of the well-known minor type is employed. This switch is provided with four double ended wipers 94, 95, 96 and 97 respectively associated with four 10 point contact strips 100, 101, 102 and 103 and also includes a release magnet 98*a* and a stepping magnet 98 energizable through self-controlled interrupting contacts 99 to drive the identified wipers over the contacts of their respective associated contact strips. Hereinafter, the illustrated top contact of each contact strip is referred to as the No. 1 or first contact and the other contacts of each strip are counted in a downward direction. In order selectively to control the setting of the switch 93 in accordance with the particular frequency transmitted from the tunable oscillator 81 over the signal channel 19, a plurality of frequency selective signals and control channels are provided in the selector 83. The first of these channels comprises a sharply tuned band pass filter 86*a* having its input terminals connected to the signal channel 19 and designed to pass the 5,000 cycle identification signal representing the program A to the input side of a rectifier and control unit 87*a*, the output circuit of which includes the winding of a control relay 88*a*. Similarly the signal channel comprising the band pass filter 86*b*, the rectifier and control tube unit 87*b* and the control relay 88*b* is designed to respond only to the identification signal of 6,000 cycles representing the particular program B. The third signal channel comprising the band pass filter 86*c*, the rectifier and control tube 87*c* and the signal repeating relay 88*c* is similarly designed to respond only to the identification signal having a frequency of 7,000 cycles representing all other programs of Red network origin. Finally, the fourth or selector release channel comprising the band pass filter 86*d*, the rectifier and control tube unit 87*d* and the release magnet 98*a* is designed to respond only to selector release signals having a frequency of 8,000 cycles per second. As indicated above, the circuit arrangement of the selectors 84 and 85 respectively provided at the transmitters 13 and 14 is identical in all respects with that of selector 83 just described. Hence, corresponding circuit components of the two selectors 83 and 84 have been identified by like reference characters distinguished only by the use of primes in conjunction with the reference characters identifying the circuit components of the selector 84. At this point, it is noted that the near sub-audible frequency identification signal generators 90', 91' and 92' provided in the selector 84 commonly to identify the transmitter 13 and respectively to identify the programs A and B and all other programs have output frequencies different from each other and from the output frequencies of the corresponding signal generators respectively included in the signal selectors 83 and 85. By way of illustration, these generators as embodied in the selectors 84 may have output frequencies of 65 cycles per second 70 cycles per second and 75 cycles per second, as distinguished from the 30, 35 and 40 cycles per second output frequencies of the generators 90, 91 and 92. At this point the purpose of the isolating amplifiers 12a, 13a, and 14a becomes readily apparent. Specifically, the amplifier 12a which is a uni-directional signal transmitting device prevents the identification signals developed within the selector 83 from being fed to the transmitters 13 and 14; the amplifier 13a prevents the identification signals representing the transmitter 13 and derived from the selector 84 from being fed to the transmitters 12 and 14; and the amplifier 14a prevents the identification signals representative of the transmitter 14 and derived from the signal selector 85 from being fed to the two transmitters 12 and 13.

Briefly to consider the mode of operation of the network system shown in Fig. 5 of the drawings, it is pointed out that during the few seconds just preceding the transmission of a particular program from the program originating point at which the feed and mixing network 18 is provided, the selector switch 82 is actuated to set the oscillator 81 in operation and to tune this oscillator for generation of a signal voltage of the particular frequency identifying the particular program about to be transmitted. Thus just prior to broadcasting the particular program A, for example, the switch 82 is actuated from its oscillator off setting to include the tuning condenser 81a in the frequency determining circuit of the oscillator 81 such that a signal voltage of 5,000 cycles is transmitted over the signal channel 19 to each of the 3 selectors 83, 84 and 85. Obviously the selector switch 82 may be adjusted to effect transmission of signals of either of the other three frequencies over the signal channel 19.

At the selector 83, the signal voltage having a frequency of 5,000 cycles per second is passed only by the filter 86a to the rectifier and control tube unit 87a to effect operation of the repeating relay 88a. In operating, this relay closes its contacts 89a to complete a circuit through the multipled first to seventh, ninth and tenth contacts of the contact strip 103, the wiper 97 and the contacts 99 for energizing the stepping magnet 98 of the selector switch 93. When energized in this circuit, the magnet 98 operates buzzer fashion to drive the wipers 94, 95, 96 and 97 until they engage the respective eighth contacts of their respectively associated contact strips. Since the eighth contact of the strip 103 is not included in the multiple connected to the make contacts 89a of the repeating relay 88a, operation of the selector switch 83 is obviously arrested when the wiper 97 of this switch is positioned on its associated eighth contact. In a similar manner, the selector switch 93' of the signal selector 84 and the corresponding selector switch of the signal selector 85 respond to the program identification signal transmitted over the channel 19 by operating to positions wherein the wipers thereof engage their respective associated eighth contacts. With the wipers of the switch 93 in this position, an obvious circuit is completed through the wiper 94 for impressing the output voltage of the signal generator 90 upon the input terminals of the transmitter 12. Similarly, the wiper 94' of the selector switch 93' is positioned to impress the output voltage of the signal generator 90' upon the input terminals of the transmitter 13.

Immediately before transmission of the program A is started, the selector switch 82 is operated to its oscillator off setting to terminate the operation of the oscillator 81 and thus effect de-energization of the relays 88a and 88'a in the selectors 83 and 84 and the corresponding repeating relay in the selector 85. The selector switches 93, 93', etc., however, remain standing in their respective off normal settings wherein the signal generators 90 and 90' have their signal output voltages impressed across the input terminals of the transmitters 12 and 13, respectively. Thus distinguishable station and program identification signals are radiated by the transmitters 12, 13 and 14 along with the program signals. Immediately transmission of the particular program A is terminated, the selector switch 82 is operated to re-initiate operation of the oscillator 81 with the condenser 81d included in the frequency determining circuit thereof. The resulting signal voltage as transmitted over the signal channel 19 is utilized to effect the release of the selector switches individually included in the signal selectors 83, 84 and 85. Specifically, this signal as received in the transmitter 12 is passed only by the band pass filter 86d to the rectifier and control tube unit 87d to effect operation of the release magnet 98a. In operating, this magnet causes the wipers of the selector switch 93 to be restored to their respective normal positions in a manner well understood in the art. In an entirely similar manner, the selector switch 93' and that provided in the signal selector 85 are released in preparation for resetting under the selective control of the oscillator 81 and selector switch 82.

From the preceding explanation it will be understood that in the event the identification signal corresponding to the program B is transmitted from the program originating point over the signal channel 19 in response to inclusion of the condenser 81b in the frequency determining circuit of the oscillator 81, the repeating relays 88b and 88'b are operated in the two signal selectors 82 and 84. With the relay 88b operated, a circuit is completed through the multipled contacts of the contact strip 102 and the wiper 96 for energizing the operating magnet 98. In this case the operating magnet 98 operates buzzer fashion to drive the wipers 94 and 97, inclusive. until they engage their respective associated ninth contacts, at which time the operating circuit for the magnet 98 is opened in the open circuited ninth contact of the strip 102. With the selector switch 93 in this position, the signal generator 91 is obviously connected to impress its output voltage across the input terminals of the transmitter 12. Similarly, if the all other programs signal is transmitted from the program originating point over the signal channel 19, the repeating relay 88c is operated to effect operation of the selector switch 93 to a setting wherein the wipers 94, 95, 96 and 97 thereof engage the tenth contacts of their respective associated contact strips, i. e. a setting wherein the signal generator 92 is connected to impress its output voltage across the input terminals of the transmitter 12. The selector switches of the two other signal selectors 84 and 85 are similarly controllable on a selective basis to connect any one of the program and station identification signal generators to the input sides of their respective associated transmitters 13 and 14. In this regard it will be understood that the selector switches respectively embodied in these selectors are restored to normal in the exact manner explained above at the end of each program of particular interest.

The manner in which the program and station identification signals as radiated by the transmitters 12, 13 and 14 are received, selected and recorded by the recording facilities respectively provided at the wave signal receivers located in the homes of the system collaborators is exactly the same as explained above with reference to Fig. 3 of the drawings. From this explanation it will be apparent that the present improved system affords a positive and reliable means of obtaining data regarding the listening habits of wave signal users. Specifically, the records formed are of such character that they are readily translatable on an entirely automatic basis into a form suitable for statistical analysis through the use of conventional statistical analyzing machines. Although the invention has been described as embodying the feature of continuous record tape movement at each of the wave signal receivers used in the system, it will be understood that since the character of the record is positively identifiable on a program or program and station basis, continuous record tape movement is not necessarily required. For example, if the translating facilities are suitably arranged to effect program identification on a tape matching basis through the use of master tapes derived from recorders which monitor the program signals originating at each transmitter within the area of reception of a given receiver, it may suffice to run the recorders at the collaborator receivers only during the periods of receiver use. In any event and due to the fact that the program identification records uniquely identify the particular programs of interest and the further fact that these programs only occur at specific known periods, it will be understood that the timed movement of the record tapes during recording is in no way critical. Thus one of the major problems in satisfactory operations of systems known to the prior art is obviated in an entirely satisfactory manner.

While there has been described what is at present considered to be the preferred embodiment of the invention, it will be understood that various modifications may be made therein which are within the true spirit and scope of the invention as defined in the appended claims.

I claim:

1. In combination with a plurality of different wave signal transmitters adapted for signal channel connection to the same program originating point, means for transmitting over said signal channel to each of said transmitters different program identification signals respectively identifying different programs, selectively operable switching means at said transmitters selectively responsive to said program identification signals for impressing upon the wave signals radiated by said transmitters different identification signals which commonly identify the program being transmitted and individually identify the different transmitters from which the program is being transmitted, a plurality of wave signal receivers each tunable to receive signals from at least a portion of said transmitters, each of said receivers being provided with a signal translating channel, signal selecting means coupled to the signal translating channel of each of said receivers for selecting the one of said identification signals appearing in the channel incident to the reception of the corresponding one of said programs by the associated receiver, and means coupled to the signal selecting means associated with each of said receivers for producing distinguishable indications of the reception of said programs by the receiver.

2. In combination with a plurality of network transmitters which are controlled from the same program signal originating point to radiate different carrier waves modulated with the same program signals, means for modifying the radiated signals of all of said transmitters in accordance with the same distinctive program identification signal, a plurality of wave signal receivers each tunable to receive signals from at least a portion of said transmitters, and means associated with each of said receivers and responsive to said modified signal only when the associated receiver is conditioned for signal reception for producing an indication identifying the program being received by the receiver.

3. In a system for determining the audience popularity of particular programs radiated as signal modulated carriers from different wave signal transmitters during the same or different time intervals, transmitters for radiating said signal modulated carriers, means for further modulating the signal modulated carried outputs of said transmitters with predetermined and substantially non-audible signals capable of being transmitted through the audio frequency channels of wave signal broadcast receivers and uniquely identifying said particular programs, a plurality of wave signal receivers each selectively tunable to receive signals radiated from at least a portion of said transmitters and provided with an audio frequency channel, a recorder coupled to the audio frequency channel of each of said receivers for recording said predetermined signals in phonographically reproductible form when the receiver is tuned to receive any one of said particular programs, and means included in the coupling path between each of said recorders and its associated receiver for preventing the recorder from recording program signal voltages appearing in the audio frequency channel of the receiver concurrently with one of said predetermined signals.

4. In combination with a plurality of network transmitters which are controlled from at least one common program signal originating point to radiate different carrier waves commonly modulated with the signals derived from the same programs during each of different broadcasting intervals, selectively operable means for also modulating said carriers with a plurality of different program identification signals during said different broadcasting intervals, a plurality of wave signal receivers each tunable to receive signals from at least a portion of said transmitters, each of said receivers being provided with a signal translating channel, signal selecting means coupled to the signal translating channel of each of said receivers for selecting the one of said program identification signals appearing in the channel incident to the reception of the corresponding one of said programs by the associated receiver, and means coupled to the signal selecting means associated with each of said receivers for producing distinguishable indications of the reception of said programs by the receiver.

5. In combination with a plurality of network transmitters which are controlled from at least one common program signal originating point to radiate different carrier waves commonly modulated with the signals derived from the same programs during each of different broadcasting intervals, selectively operable means for also modulating said carriers with a plurality of different program identification signals during said different broadcasting intrevals, a plurality of wave signal receivers each tunable to receive signals from at least a portion of said transmitters, each of said receivers being provided with a signal translating channel including a low frequency section in which said program signals and said program identification signals are reproduced, signal selecting means coupled to the low frequency section of the signal translating channel of each of said receivers for selecting, while rejecting the program signals, the one of said program identification signals appearing in said channel incident to the reception of the corresponding one of said programs by the associated receiver, and recording means coupled to the signal selecting means associated with each of said receivers for producing a phonographically reproducible record of the program identification signals selected by said signal selecting means.

SERGE A. SCHERBATSKOY.

REFERENCES CITED

The following references are of record in the file of this patent:

UNITED STATES PATENTS

| Number | Name | Date |
|---|---|---|
| 1,615,712 | Loth | Jan. 25, 1927 |
| 2,047,929 | Linder | July 14, 1936 |
| 2,047,930 | Linder | July 14, 1936 |
| 2,077,205 | Becker | Apr. 13, 1937 |
| 2,096,109 | Hopkins | Oct. 19, 1937 |
| 2,162,901 | Van Dyck | June 20, 1939 |
| 2,197,341 | Jonker | Apr. 16, 1940 |
| 2,203,807 | Wolff | June 11, 1940 |
| 2,213,886 | Potter | Sept. 3, 1940 |
| 2,252,083 | Luck | Aug. 12, 1941 |
| 2,257,094 | Goldstine | Sept. 30, 1941 |
| 2,270,899 | Roder | Jan. 27, 1942 |
| 2,287,044 | Kroger | June 23, 1942 |
| 2,368,778 | Purington | Feb. 6, 1945 |
| 2,419,525 | Alford | Apr. 29, 1947 |